United States Patent
Seo et al.

(10) Patent No.: US 9,809,700 B2
(45) Date of Patent: Nov. 7, 2017

(54) AIR HOSE FOR AUTOMOBILE

(71) Applicant: TOYODA GOSEI CO., LTD., Kiyosu-si, Aichi-ken (JP)

(72) Inventors: Akishige Seo, Kiyosu (JP); Hidekazu Kurimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/113,081

(22) PCT Filed: Jun. 10, 2015

(86) PCT No.: PCT/JP2015/066665
§ 371 (c)(1),
(2) Date: Jul. 21, 2016

(87) PCT Pub. No.: WO2016/051874
PCT Pub. Date: Apr. 7, 2016

(65) Prior Publication Data
US 2017/0002183 A1   Jan. 5, 2017

(30) Foreign Application Priority Data
Sep. 29, 2014  (JP) .................................. 2014-199499

(51) Int. Cl.
*C08L 9/02*     (2006.01)
*C08K 5/357*    (2006.01)
(Continued)

(52) U.S. Cl.
CPC .................. *C08L 9/02* (2013.01); *C08K 5/11* (2013.01); *C08K 5/357* (2013.01); *C08K 5/40* (2013.01);
(Continued)

(58) Field of Classification Search
CPC .. C08L 9/02; C08K 9/357; C08K 5/40; C08K 5/47; C08K 5/11; C08K 5/43; F16L 11/04
See application file for complete search history.

(56) References Cited

FOREIGN PATENT DOCUMENTS

CN      1177695 A      4/1998
CN    103012881 A      4/2013
(Continued)

OTHER PUBLICATIONS

International Preliminary Report on Patentability of the International Searching Authority dated Apr. 13, 2017 for the corresponding international application No. PCT/JP2015/066665 (and English translation).

(Continued)

*Primary Examiner* — Michael C Miggins
(74) *Attorney, Agent, or Firm* — Posz Law Group, PLC

(57) ABSTRACT

An air hose for an automobile, which has a two-layered structure of an inner tube made of an NBR composition and an outer cover made of a CSM composition, wherein the NBR composition satisfies (A) and (B) below: (A) an unvulcanized NBR in which an amount of AN is 30 to 50 and a Mooney viscosity (ML (1+4) 100° C.) is 50 to 90, is vulcanized in the presence of 0.5 to 7.0 parts by mass of a thiuram compound serving as a vulcanization accelerator, 0 to 2.5 parts by mass of 4,4'-dithio dimorpholine, and 2.0 to 7.0 parts by mass of a thiazole compound to 100 parts by mass of the unvulcanized NBR; and (B) 5 to 50 parts by mass of a plasticizer having a molecular weight of 700 to 2,000 is blended to 100 parts by mass of the unvulcanized NBR.

2 Claims, 2 Drawing Sheets

(51) Int. Cl.

| | | |
|---|---|---|
| *C08K 5/40* | (2006.01) | |
| *C08K 5/47* | (2006.01) | |
| *C08K 5/11* | (2006.01) | |
| *C08K 5/43* | (2006.01) | |
| *F16L 11/04* | (2006.01) | |

(52) U.S. Cl.
 CPC .................. *C08K 5/43* (2013.01); *C08K 5/47* (2013.01); *F16L 11/04* (2013.01)

(56) References Cited

FOREIGN PATENT DOCUMENTS

| JP | S63-308038 A | 12/1988 |
|---|---|---|
| JP | H04-216837 A | 8/1992 |
| JP | H08-100083 | 4/1996 |
| JP | H09-020836 A | 1/1997 |
| JP | H10-078172 A | 3/1998 |
| JP | 2001-310975 A | 11/2001 |
| JP | 2015-101693 A | 6/2015 |

OTHER PUBLICATIONS

Office Action dated May 10, 2017 issued in corresponding CN application No. 201580013174.4.
English machine translation of Office Action dated May 10, 2017 issued in corresponding CN application No. 201580013174.4.
International Search Report of the International Searching Authority dated Sep. 15, 2015 for the corresponding international application No. PCT/JP2015/066665 (and English translation).

F I G. 2
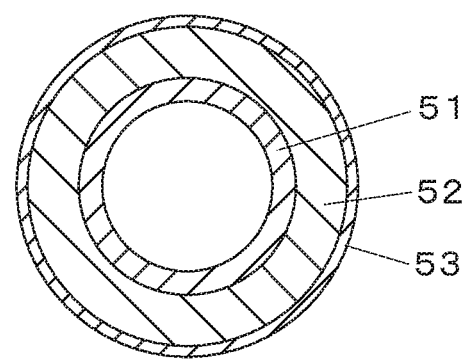

AIR HOSE FOR AUTOMOBILE

CROSS REFERENCE TO RELATED APPLICATIONS

This application is a U.S. national stage application of PCT/JP2015/066665 filed on Jun. 10, 2015, and claims priority to Japanese Patent Publication No. 2014-199499 filed on Sep. 29, 2014, the disclosures of which are incorporated herein by reference.

TECHNICAL FIELD

The present invention relates to air hoses for automobiles (PCV hoses, turbo air hoses, emission control hoses, vacuum brake hoses, and the like).

BACKGROUND

A blow-by gas (including an unburned fuel and/or an exhaust gas) leaked from gap between a cylinder and a piston of an engine to a crankcase is mixed with a misty engine oil scattering in the crankcase, and the engine oil in an oil pan becomes contaminated. Thus, a portion of a cylinder head cover communicating with the crankcase and an intake passage of the engine are communicated with each other via a hose, so that the blow-by gas in the crankcase, which contains oil mist, is actively ventilated by aspiration with negative pressure of the intake passage. This mechanism is referred to as positive crankcase ventilation (abbreviated as PCV), and the hose is referred to as a PCV hose (or a blow-by hose).

Accordingly, the blow-by gas containing oil mist passes through the PCV hose, and the PCV hose is also exposed to heat, and thus the PCV hose is required to be resistant to both oil and heat. In addition, the PCV hose is required to be resistant to ozone in order to avoid deterioration caused by ozone contained in external air. These performances are similarly required of air hoses for automobiles other than the PCV hose.

Thus, many of air hoses for automobiles have two-layered structures, and the two-layered structure is composed of an inner tube made of a butadiene-acrylonitrile copolymer rubber (NBR) that is a typical oil-resistant rubber and an outer cover made of a chlorosulfonated polyethylene rubber (CSM) that is excellently ozone-resistant (Patent Document 1).

However, heat resistance, chemical resistance, and the like of NBR is limited, because the main chain of NBR contains an unstable unsaturated bond (a carbon-carbon double bond), and thus the conventional NBR is not sufficiently resistant to heat when the NBR is used for air hoses that are required to be more highly resistant to heat.

Therefore, hydrogenated NBR (HNBR), in which an unsaturated bond portion is changed to a saturated bond by hydrogenating the unsaturated bond portion so as to improve heat resistance and the like, has been used. That is, an inner tube has a two-layered structure composed of an inner tube made of HNBR and an outer cover made of CSM; or has a three-layered structure composed of an inner tube 51 made of HNBR, a middle layer 52 made of NBR, and an outer cover 53, as shown in FIG. 2.

However, the cost of HNBR is higher than that of NBR, and thus it has been required to improve heat resistance of NBR rather than using HNBR.

As a method for improving heat resistance of NBR, using dibenzothiazyl disulfide as a vulcanization accelerator (Patent Document 2) has been known. In order to enable vulcanization at a high temperature in a short time, using dibenzothiazyl disulfide and/or tetramethylthiuram monosulfide (Patent Document 3) has been also known.

However, according to studies conducted by the inventors of the present invention, these methods did not provide sufficient heat resistance to NBR.

PATENT DOCUMENTS

Patent Document 1: Japanese Patent Application Publication No. H10-78172
Patent Document 2: Japanese Patent Application Publication No. S63-308038
Patent Document 3: Japanese Patent Application Publication No. H4-216837

SUMMARY

An object of the present invention is to provide a highly heat-resistant air hose for an automobile with a low cost.

An air hose for an automobile according to the present invention, which has a two-layered structure of an inner tube made of an NBR composition and an outer cover made of a CSM composition, the air hose characterized in that the NBR composition satisfies (A) and (B) below:

(A) an unvulcanized NBR in which an amount of AN is 30 to 50 and a Mooney viscosity (ML (1+4) 100° C.) is 50 to 90, is vulcanized in the presence of 0.5 to 7.0 parts by mass of a thiuram compound serving as a vulcanization accelerator, 0 to 2.5 parts by mass of 4,4'-dithio dimorpholine, and 2.0 to 7.0 parts by mass of a thiazole compound to 100 parts by mass of the unvulcanized NBR, and (B) 5 to 50 parts by mass of a plasticizer having a molecular weight of 700 to 2,000 is blended to 100 parts by mass of the unvulcanized NBR.

According to the present invention, by using the vulcanization accelerator specified as above, heat resistance of an inner tube made of an NBR composition can be improved, and particularly decrease in elongation by heat can be suppressed.

Also, by using the plasticizer specified as above, heat resistance of an inner tube made of an NBR composition can be improved, and particularly increase in hardness by heat can be suppressed.

According to the present invention, the NBR composition preferably further satisfies (C) below:

(C) As physical properties after a heat aging test conducted in the air at 120° C. for 20 days, hardness HS is 90 or less, and elongation at break EB is 140% or more.

Hereinafter, details of each of the components, aspects, and the like in the present invention will be explained. Note that when blending amounts are described for materials other than NBR, the blending amounts are described as part(s) by mass to 100 parts by mass of unvulcanized NBR.

<Inner Tube Made of NBR Composition>

1. NBR

An amount of AN (acrylonitrile) in unvulcanized NBR should be 30 to 50, because if the amount is less than 30, oil resistance that is a demanded characteristic will be poor, and if the amount is over 50, characteristics as rubber will be poor. The amount of AN refers to a mass ratio of acrylonitrile provided that the total mass of NBR is 100% by mass.

The Mooney viscosity of unvulcanized NBR should be 50 to 90 in view of extrudability at the time of manufacturing hoses. If the Mooney viscosity is less than 50, an extrusion rate will be too fast, and if the Mooney viscosity is over 90, the extrusion rate will be too slow.

2. Chemical for Vulcanization 2-1. Vulcanizing Agent

A vulcanizing agent is not particularly limited, and examples thereof include sulfur, sulfur compounds, maleimides, and organic vulcanizing agents. One of them may be used alone, or two or more of them may be used in combination. For example, when sulfur is used, the blending amount thereof is preferably 0.1 to 1.0 part by mass.

2-2. Vulcanization Accelerator

As described above, a thiuram compound and a thiazole compound are used in combination as a vulcanization accelerator, in which 4,4'-dithio dimorpholine is not used or used with a suppressed blending amount.

(1) Examples of the thiuram compound include tetramethylthiuram disulfide, tetramethylthiuram monosulfide, tetraethylthiuram disulfide, tetrabutylthiuram disulfide, tetrakis (2-ethylhexyl)thiuram disulfide, and dipentamethylenethiuram tetrasulfide, but not limited thereto.

The blending amount of the thiuram compound should be 0.5 to 7.0 parts by mass, because if the amount is less than 0.5 part by mass, vulcanization will be insufficient, and if the amount is over 7.0 parts by mass, bloom occurs, which may result in a defective appearance. More preferably, the blending amount is 0.5 to 5.0 parts by mass.

(2) The blending amount of 4,4'-dithio dimorpholine should be 2.5 parts by mass or less, because if the amount is over 2.5 parts by mass, heat resistance will be poor.

(3) Examples of the thiazole compound include dibenzothiazyl disulfide, 2-mercaptobenzothiazole, a zinc salt of 2-mercaptobenzothiazole, a cyclohexylamine salt of 2-mercaptobenzothiazole, 2-(N,N'-diethylthiocarbamoylthio)benzothiazole, and 2-(4'-morpholinodithio)benzothiazole, but not limited thereto.

The blending amount of the thiazole compound should be 1.5 to 7.0 parts by mass, because if the amount is less than 1.5 parts by mass, heat resistance will be poor, and if the amount is over 7.0 parts by mass, bloom occurs, which may result in a defective appearance. More preferably, the blending amount is 2.0 to 5.0 parts by mass.

3. Plasticizer

The molecular weight of a plasticizer should be 700 to 2,000, because if the molecular weight is less than 700, volatility of the plasticizer will increase, and if the molecular weight is over 2,000, viscosity of the plasticizer will increase, and kneading processability will be poor.

The blending amount of the plasticizer should be 5 to 50 parts by mass, because if the amount is less than 5 parts by mass, hardness will be too high, and if the amount is over 50 parts by mass, bloom occurs, which may result in a defective appearance. More preferably, the blending amount is 15 to 40 parts by mass.

The plasticizer is composed of, for example, adipic acid, ether, ester, phosphate, or the like, which can be adapted to NBR and has an SP value of 8.5 to 10.5, but not particularly limited thereto.

4. Other Materials to be Blended

In addition to the materials described above, carbon black, filler, a vulcanization aid, an antioxidant, a processing aid, a filling material, a softener, an acid acceptor, a colorant, an antiscorching agent, and the like can suitably be blended in the NBR composition.

5. Physical Property After Heat Aging Test at 120° C. for 20 Days

"Highly heat-resistant" means that change (increase) in hardness and change (decrease) in elongation after heat aging are small. As physical properties after a heat aging test conducted in the air at 120° C. for 20 days, if hardness HS is 90 or less, and elongation at break EB is 140% or more, heat resistance can be evaluated as sufficiently high. Preferably, hardness HS is 60 to 90, and elongation EB is 150 to 300%.

More preferably, in a heat aging test at 120° C. for 20 days, hardness HS is 50 to 70 before the test, and is 75 to 90 after the test; and elongation at break EB is 300 to 800% before the test, and is 150 to 250% after the test.

<Outer Cover Made of CSM Composition>

Materials to be blended in the CSM composition and physical properties of the CSM composition are not particularly limited.

<Method for Manufacturing Air Hose for Automobile>

A method for manufacturing an air hose for an automobile is not particularly limited, and conventional manufacturing methods can be used. In such a conventional method, for example, extrusion molding an inner tube made of an NBR composition; extrusion molding an outer cover made of a CSM composition on the outer periphery of the inner tube; and then conducting vulcanization by using a variety of vulcanization methods, such as steam vulcanization, hot air vulcanization, and electron beam vulcanization.

<Air Hose for Automobile>

Examples of the air hose for an automobile include a PCV hose, a turbo air hose, an emission control hose, and a vacuum brake hose.

According to the present invention, a highly heat-resistant air hose for an automobile can be provided at a low cost.

BRIEF DESCRIPTION OF THE DRAWINGS

FIG. 2 shows a cross-sectional view of an air hose for an automobile according to a conventional example.

DETAILED DESCRIPTION

Figure 1:
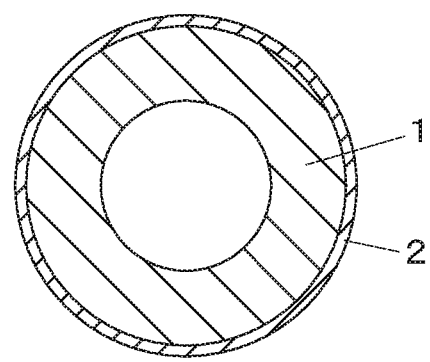
FIG. 1 shows a cross-sectional view of an air hose for an automobile according to Examples.

In an air hose for an automobile, which has a two-layered structure of an inner tube made of an NBR composition and an outer cover made of a CSM composition, the NBR composition satisfies (A), (B), and (C) below.

(A) An unvulcanized NBR in which an amount of AN is 30 to 50, and the Mooney viscosity (ML (1+4) 100° C.) is 50 to 90, is vulcanized in the presence of 0.5 to 7.0 parts by mass of a thiuram compound serving as a vulcanization accelerator, 0 to 2.5 parts by mass of 4,4'-dithio dimorpholine, and 2.0 to 7.0 parts by mass of a thiazole compound to 100 parts by mass of the unvulcanized NBR.

(B) 5 to 50 parts by mass of a plasticizer having a molecular weight of 700 to 2,000 is blended to 100 parts by mass of the unvulcanized NBR.

(C) As physical properties after a heat aging test conducted in the air at 120° C. for 20 days, hardness HS is 90 or less, and elongation at break EB is 140% or more.

EXAMPLES

As the NBR composition for the inner tube of an air hose for an automobile, NBR compositions of Examples 1 to 7 and Comparative Examples 1 to 5, each having a composition shown in Table 1 below, were prepared.

TABLE 1

| | | | Example 1 | Example 2 | Comparative Example 1 | Comparative Example 2 | Example 3 | Example 4 |
|---|---|---|---|---|---|---|---|---|
| Blending part(s) by mass | Polymer | NBR (AN: 41, ML (1 + 4) at 100° C.: 82) | 100 | | | 100 | 100 | 100 |
| | | NBR (AN: 34, ML (1 + 4) at 100° C.: 72) | | 100 | (*) 50 | | | |
| | | NBR (AN: 18, ML (1 + 4) at 100° C.: 65) | | | 50 | | | |
| | Carbon | MAF carbon black | 65 | 65 | 65 | 65 | 65 | 65 |
| | Filler | Calcium carbonate | 20 | 20 | 20 | 20 | 20 | 20 |
| | Plasticizer | Adipic acid-ether-ester plasticizer (Molecular weight: 434) | | | | 25 | | |
| | | Polyether-ester plasticizer (Molecular weight: about 850) | 25 | 25 | 25 | | 25 | 25 |
| | Vulcanization Accelerator | Zinc oxide | 3 | 3 | 3 | 3 | 3 | 3 |
| | Vulcanization aid | Stearic acid | 0.5 | 0.5 | 0.5 | 0.5 | 0.5 | 0.5 |
| | Antioxidant | N-phenyl-N'-isopropyl-p-phenylenediamine | 2 | 2 | 2 | 2 | 2 | 2 |
| | | 2,2,4-trimethyl-1,2-dihydroquinoline polymer | 1 | 1 | 1 | 1 | 1 | 1 |
| | Processing aid | Rosin | 1 | 1 | 1 | 1 | 1 | 1 |
| | | Wax | 2 | 2 | 2 | 2 | 2 | 2 |
| | Vulcanizing Agent | Sulfur powder | 0.3 | 0.3 | 0.3 | 0.3 | 0.3 | 0.3 |
| | Vulcanization Accelerator | Thiuram | TMTD (tetramethylthiuram disulfide) | | | | | 1 | 1 |
| | | | TMTM (tetramethylthiuram monosulfide) | 1 | 1 | 1 | 1 | | |
| | | Morpholine | 4,4'-dithio dimorpholine | 0.5 | 0.5 | 0.5 | 0.5 | 0.5 | |
| | | Thiazole | MBTS (dibenzothiazyl disulfide) | 2 | 2 | 2 | 2 | 2 | 2 |
| | | Sulfenamide | CBS N-cyclohexyl-2-benzothiazolylsulfenamide | | | | | | |
| Physical Property | Normal physical property | Hardness HS | 62 | 62 | 62 | 63 | 62 | 63 |
| | | Tensile strength TB (MPa) | 15.4 | 14.1 | 13.5 | 14.7 | 15.1 | 17.1 |
| | | 30% Tensile stress S30 (MPa) | 0.75 | 0.77 | 0.78 | 0.76 | 0.75 | 0.85 |
| | | Elongation at break EB (%) | 650 | 560 | 480 | 660 | 650 | 580 |
| | Oil Resistance (IRM903, 120° C., 70 h Immersion) | Swelling ΔV (%) Target value: +5% or less | −4.9 ◯ | +2.1 ◯ | +14.1 X | −4.4 ◯ | −2.3 ◯ | −5.1 ◯ |
| | Heat Resistance (After 20 Days of Aging at 120° C.) | Hardness HS Target value: 90 or less | 82 ◯ | 81 ◯ | 82 ◯ | 92 X | 82 ◯ | 84 ◯ |
| | | Change in hardness ΔHS | 20 | 19 | 20 | 29 | 20 | 21 |
| | | Elongation at break EB (%) Target value: 150% or more | 170 ◯ | 150 ◯ | 150 ◯ | 150 ◯ | 170 ◯ | 150 ◯ |
| | | Change in elongation at break ΔEB (%) | −74 | −73 | −69 | −77 | −74 | −74 |

| | | | Example 5 | Comparative Example 3 | Comparative Example 4 | Example 6 | Example 7 | Comparative Example 5 |
|---|---|---|---|---|---|---|---|---|
| Blending part(s) by mass | Polymer | NBR (AN: 41, ML (1 + 4) at 100° C.: 82) | 100 | 100 | 100 | 100 | 100 | 100 |
| | | NBR (AN: 34, ML (1 + 4) at 100° C.: 72) | | | | | | |
| | | NBR (AN: 18, ML (1 + 4) at 100° C.: 65) | | | | | | |
| | Carbon | MAF carbon black | 65 | 65 | 65 | 65 | 65 | 65 |
| | Filler | Calcium carbonate | 20 | 20 | 20 | 20 | 20 | 20 |
| | Plasticizer | Adipic acid-ether-ester plasticizer (Molecular weight: 434) | | | | | | |
| | | Polyether-ester plasticizer (Molecular weight: about 850) | 25 | 25 | 25 | 25 | 25 | 25 |
| | Vulcanization Accelerator | Zinc oxide | 3 | 3 | 3 | 3 | 3 | 3 |
| | Vulcanization aid | Stearic acid | 0.5 | 0.5 | 0.5 | 0.5 | 0.5 | 0.5 |
| | Antioxidant | N-phenyl-N'-isopropyl-p-phenylenediamine | 2 | 2 | 2 | 2 | 2 | 2 |
| | | 2,2,4-trimethyl-1,2-dihydroquinoline polymer | 1 | 1 | 1 | 1 | 1 | 1 |
| | Processing aid | Rosin | 1 | 1 | 1 | 1 | 1 | 1 |
| | | Wax | 2 | 2 | 2 | 2 | 2 | 2 |
| | Vulcanizing Agent | Sulfur powder | 0.3 | 0.3 | 0.3 | 0.3 | 0.3 | 0.3 |
| | Vulcanization Accelerator | Thiuram | TMTD (tetramethylthiuram disulfide) | 1 | 1 | 1 | 1 | 4 | 1 |
| | | | TMTM (tetramethylthiuram monosulfide) | | | | | | |
| | | Morpholine | 4,4'-dithio dimorpholine | 1 | 3 | 0.5 | 0.5 | 0.5 | 0.5 |
| | | Thiazole | MBTS (dibenzothiazyl disulfide) | 2 | 2 | 1 | 4 | 2 | |
| | | Sulfenamide | CBS N-cyclohexyl-2-benzothiazolylsulfenamide | | | | | | 2 |
| Physical Property | Normal physical property | Hardness HS | 64 | 65 | 63 | 63 | 64 | 63 |
| | | Tensile strength TB (MPa) | 17.6 | 17.7 | 16.8 | 17.0 | 17.1 | 17.1 |
| | | 30% Tensile stress S30 (MPa) | 0.94 | 1.08 | 0.81 | 0.87 | 1.06 | 0.81 |
| | | Elongation at break EB (%) | 560 | 490 | 600 | 570 | 490 | 630 |

TABLE 1-continued

|  |  | | | | | | | | | | | |
|---|---|---|---|---|---|---|---|---|---|---|---|---|
| Oil Resistance (IRM903, 120° C., 70 h Immersion) | Swelling ΔV (%) Target value +5% or less | −5.5 | ○ | −6.2 | ○ | −4.9 | ○ | −5.1 | ○ | −5.4 | ○ | −5.1 | ○ |
| Heat Resistance (After 20 Days of Aging at 120° C.) | Hardness HS Target value 90 or less | 84 | ○ | 84 | ○ | 84 | ○ | 84 | ○ | 84 | ○ | 84 | ○ |
|  | Change in hardness ΔHS | 20 |  | 19 |  | 21 |  | 21 |  | 20 |  | 21 |  |
|  | Elongation at break EB (%) Target value 150% or more | 150 | ○ | 130 | X | 120 | X | 160 | ○ | 150 | ○ | 90 | X |
|  | Change in elongation at break ΔEB (%) | −73 |  | −73 |  | −80 |  | −72 |  | −69 |  | −86 |  |

(*) Using 2 kinds is equivalent to AN26

As the materials shown in Table 1, the following products were used.

NBR (AN 41): the product name "Nipol 1041" manufactured by Zeon Corporation.

NBR (AN 34): the product name "N237H" manufactured by JSR Corporation.

NBR (AN 18): the product name "DN401L" manufactured by Zeon Corporation.

Note that values of an amount of AN and the Mooney viscosity (ML (1+4) 100° C.) (this value is considered to be according to JIS K6300) for each of the NBRs are those listed on the products.

MAF carbon black: the product name "SEAST G-116" manufactured by Tokai Carbon Co. Ltd.

Calcium carbonate: the product name "Silver-W" manufactured by Shiraishi Kogyo Kaisha, Ltd.

Adipic acid-ether-ester plasticizer: the product name "RS 107" manufactured by ADEKA Corporation.

Polyether-ester plasticizer: the product name "RS 735" manufactured by ADEKA Corporation.

Zinc oxide: the product name "META-Z 102" manufactured by Inoue Calcium Corporation.

Stearic acid: the product name "LUNAC S-50V" manufactured by Kao Corporation.

N-phenyl-N'-isopropyl-p-phenylenediamine: the product name "NOCRAC 810 NA" manufactured by Ouchi Shinko Chemical Industrial Co. Ltd.

2,2,4-trimethyl-1,2-dihydroquinoline polymer: the product name "NOCRAC 224" manufactured by Ouchi Shinko Chemical Industrial Co. Ltd.

Sulfur powder: the product name "GOLDEN FLOWER SULFUR POWDER 200 mesh" manufactured by Tsurumi Chemical Industry Co., Ltd.

TMTD: the product name "NOCCELER TT" manufactured by Ouchi Shinko Chemical Industrial Co. Ltd.

TMTM: the product name "NOCCELER TS" manufactured by Ouchi Shinko Chemical Industrial Co. Ltd.

4,4'-dithio dimorpholine: the product name "VULNOC R" manufactured by Ouchi Shinko Chemical Industrial Co. Ltd.

MBTS: the product name "NOCCELER DM" manufactured by Ouchi Shinko Chemical Industrial Co. Ltd.

CBS: the product name "NOCCELER CZ" manufactured by Ouchi Shinko Chemical Industrial Co. Ltd.

Each of the NBR compositions of Examples 1 to 7 and Comparative Examples 1 to 5 was kneaded in a kneader, and then was molded to be a test piece for each of the following tests, and was press vulcanized at 160° C. for 15 minutes.

Physical properties of each of the NBR compositions of Examples 1 to 7 and Comparative Examples 1 and 5 were tested and measured as below, and evaluation results are shown in Table 1.

1. Normal Characteristic

According to JIS K6253, a hardness test was conducted at a normal temperature, and hardness HS was measured by using a type A durometer. Moreover, a tensile test was conducted at a normal temperature according to JIS K6251, and tensile strength TB, tensile stress at 30% elongation S30, and elongation at break EB were measured.

2. Oil Resistance

According to JIS K6258, the test piece was immersed in an IRM oil at 120° C. for 70 hours, and swelling (change in volume) ΔV was measured. When the ΔV was +5% or less, the result was evaluated as "○".

3. Heat Resistance

According to JIS K6257, a heat aging test, in which the test piece was kept heated in the air at 120° C. for 20 days in a circulating air-oven aging testing machine, and then was cooled at a room temperature for 1 day, was conducted.

After that, a hardness test was conducted at a normal temperature, and hardness HS was measured by using a type A durometer according to JIS K6253. When the value was 90 or less, which is the target value, the result was evaluated as "○". The change in hardness ΔHS is an amount of change from the normal physical properties. A tensile test was also conducted at a normal temperature according to JIS K6251 to measure elongation at break EB. When the value was 150% or more, which is the target value, the result was evaluated as "○". The change in elongation at break ΔEB is an amount of change from the normal physical properties.

In Examples 1 to 7, evaluations of oil resistance and heat resistance (hardness and elongation at break) were both "○".

However, in Comparative Example 1, an evaluation of oil resistance was "×", in Comparative Example 2, an evaluation of heat resistance (hardness and elongation at break) was "×", and in Comparative Examples 3 to 5, evaluations of heat resistance (elongation at break) were "×".

The air hose for an automobile of Examples (see FIG. 1) can be manufactured, for example, in the following manner. That is, firstly, extrusion molding an unvulcanized inner tube 1 with each of the NBR compositions of Examples 1 to 7; and then extrusion molding an unvulcanized outer cover 2 with a CSM composition (known compositions can be used) on the outer peripheral surface of the inner tube 1. Next, inserting a mandrel (not illustrated) in the unvulcanized hose thus obtained; conducting steam vulcanization under a given condition (for example, at 140 to 165° C. for 10 to 60 minutes); and taking out the mandrel. Thus, the air hose for an automobile, which has a two-layered structure, is manufactured.

Note that the present invention is not limited to Examples above and can be put into practice with suitable modification(s) without departing from the scope of the present invention.

The invention claimed is:

1. An air hose for an automobile, which has a two-layered structure of an inner tube made of an NBR composition and an outer cover made of a CSM composition, the air hose characterized in that the NBR composition satisfies (A) and (B) below:

(A) an unvulcanized NBR in which an amount of AN is 30 to 50 and a Mooney viscosity (ML (1+4) 100° C.) is 50 to 90, is vulcanized in the presence of 0.5 to 7.0 parts by mass of a thiuram compound serving as a vulcanization accelerator, 0 to 2.5 parts by mass of 4,4'-dithio dimorpholine, and 2.0 to 7.0 parts by mass of a thiazole compound to 100 parts by mass of the unvulcanized NBR; and (B) 5 to 50 parts by mass of a plasticizer having a molecular weight of 700 to 2,000 is blended to 100 parts by mass of the unvulcanized NBR.

2. The air hose for an automobile according to claim 1, wherein the NBR composition further satisfies (C) below:

(C) as physical properties after a heat aging test conducted in air at 120° C. for 20 days, hardness HS is 90 or less, and elongation at break EB is 140% or more.

* * * * *